United States Patent [19]
Yeskel

[11] Patent Number: 6,115,509
[45] Date of Patent: Sep. 5, 2000

[54] HIGH VOLUME DOCUMENT IMAGE ARCHIVE SYSTEM AND METHOD

[75] Inventor: Filip Jay Yeskel, Charlotte, N.C.

[73] Assignee: International Business Machines Corp, Armonk, N.Y.

[21] Appl. No.: 08/209,096

[22] Filed: Mar. 10, 1994

[51] Int. Cl.[7] ...................................................... G06K 9/03
[52] U.S. Cl. ............................ 382/309; 382/311; 707/1; 707/530; 345/507
[58] Field of Search .................................. 382/137, 309, 382/311, 7, 57; 707/1, 102, 104, 530; 345/507, 203; 711/100; 364/419.19, 552; 395/145, 400, 600; 358/403; 235/379, 479

[56] References Cited

U.S. PATENT DOCUMENTS

| 4,722,444 | 2/1988 | Murphy et al. | 382/57 |
|---|---|---|---|
| 4,888,812 | 12/1989 | Dinan et al. | 382/7 |
| 4,941,125 | 7/1990 | Boyne | 364/900 |
| 4,947,321 | 8/1990 | Spence et al. | 382/57 |
| 5,097,517 | 3/1992 | Holt | 382/7 |
| 5,170,466 | 12/1992 | Rogan et al. | 395/145 |
| 5,187,750 | 2/1993 | Behera | 382/7 |
| 5,257,328 | 10/1993 | Shimizu | 382/57 |

FOREIGN PATENT DOCUMENTS

| 0115189 | 8/1984 | Canada | G06K 5/00 |
|---|---|---|---|
| 0320713 | 6/1989 | European Pat. Off. | H04N 1/21 |
| 0344742 | 12/1989 | European Pat. Off. | G06K 9/00 |

OTHER PUBLICATIONS

*Computers in Banking*, Mar. 1990, USA, vol. 7, No. 3, ISSN 0742–6496, pp. 24–26, 28, 30, 63–64, S. Helm, "Banks Check Into Image Processing".
*Computers in Banking*, Apr. 1990, USA, vol. 7, No. 4, ISSN 0742–6496, pp. 12, 14–15, B. Tracey, "IBM Unveils First Stage of Image/Check System".

*Primary Examiner*—Matthew Bella
*Attorney, Agent, or Firm*—A. P. Tennent

[57] ABSTRACT

High speed machine scanning of documents such as checks produces digital check images that are placed in archival storage on mass storage devices for later retrieval. Images and/or documents are automatically reviewed by a machine in order to identify images and/or documents that are of suspect quality. Machine review of suspect images and/or documents provides a reject or accept decision. Only acceptable documents are archived. Accepted documents are formed into large data groups that contain a storage location identification for each individual document within the large data group. An index is stored for each such data group wherein the storage location of each document within the large data group is contained. Digital images are selectively converted to visual images, and these visual images are then reviewed by a human operator. This operator review is used to adjust the machine's accept/reject decision making process, thereby teaching the machine the correct manner of making its accept/reject decision.

7 Claims, 9 Drawing Sheets

FIG. 1

FIG. 2B
CAPTURE SITE 19

HIGH VOLUME DOCUMENT IMAGE ARCHIVE SYSTEM AND METHOD

CROSS-REFERENCE TO RELATED APPLICATION

U.S. Patent application Ser. No. 08/371,938, filed Jan. 12, 1995, which application is a continuation of application Ser. No. 08/195,728 entitled "Image Quality Analysis Method and Apparatus", filed Feb. 14, 1994, incorporated herein by reference.

BACKGROUND OF THE INVENTION

1. Field of the Invention

This invention pertains to the field of high speed processing of documents, such as checks, so as to produce digital images thereof, these images then being indexed and cumulatively stored on mass storage devices for later retrieval.

2. Description of the Prior Art

Financial institutions are generally required to maintain archives of financial documents and related data for several years. Typically, these archives are maintained using the original documents and/or microfilm images of the documents. In theory, imaging technology offers many advantages in maintaining these archives. However, in practice, the use of this technology to create and manage billions of document images, such as in check archives, has not been practically achieved prior to this invention.

The use of a computer-based image processing system or image capture platform to scan documents, such as checks and the like, and to then digitally store the results on mass storage devices is generally known in the art.

U.S. Pat. No. 4,888,812, incorporated herein by reference, discloses such a check processing system that is based upon an IBM 3890 high speed document reader/sorter wherein features, such as feeding checks to an image scanner, monitoring image quality and possibly interrupting the process as a result of poor image quality, image data compression, image resolution control, parallel processing of image data, and storage of check images on both high speed and low speed mass storage devices, such as magnetic storage and optical storage, are provided.

U.S. Pat. No. 4,941,125, incorporated herein by reference, describes an information storage and retrieval system wherein a digital camera scans documents to form video images. A data processor generates index information corresponding thereto. The video images and the corresponding index information are stored on different areas of optical media. The index information is generated by the use of self-index software that is responsive to text, and manually by the use of a keyboard. Remote location access is provided.

U.S. Pat. No. 5,170,466, incorporated herein by reference, discloses a storage/retrieval system wherein documents, such as checks, are scanned, digitized, compressed and stored in archival modules. The stored documents can then be retrieved and processed by workstation operators.

U.S. Pat. No. 5,187,750, incorporated herein by reference, discloses a checking account document processing, archival magnetic/optical storage, and printout system having image capture and image retrieval functions.

Prior to the present invention, one of the major impediments to the creation of a high volume image archive system was the practical difficulty associated with creating and managing an index of the billions of archived documents. Existing archival image storage devices (typically referred to as filefolder systems) are designed to store and index a volume of items that is typically at least 1,000 times smaller (i.e., typically on the order of 1 million items) than the volume of items that are stored and indexed by operation of the present invention.

The above-mentioned filefolder systems typically use an indexing method that simply assigns an index record to each item. This index record associates a unique identifier (e.g., a document capture sequence number combined with a capture date) with a pointer to the actual physical location of the item on a particular archive storage media volume. The index records for all archived items are then accumulated in a large table, or file, called an all-items file. At retrieval time, this table is searched for the index record of the item(s) to be retrieved. This index record then provides the information necessary to locate the item on an archive storage media volume.

Current computer technology places a practical limit on the size of such an all-items index file that is well below the billion item requirement of a high volume image archive system that is used to archive images of documents, such as checks.

Prior to the present invention, another major impediment to the creation of a high volume image archive system was the practical difficulty associated with managing image capture, quality assurance, indexing and archive of millions of documents daily, on a cumulative basis, without requiring human intervention. For example, existing image filefolder systems typically require human intervention on a permanent basis for at least the indexing and quality assurance steps of the process. If thousands of documents are to be captured, quality assured, indexed and archived each minute, human intervention of even a few seconds per document is clearly not practical.

SUMMARY OF THE INVENTION

The present invention provides an apparatus, process and system architecture enabling more efficient use of imaging technology to manage the capture, quality assurance, indexing and archiving of a very large number of documents on a daily, accumulating basis. A hierarchical indexing means is provided which accommodates the indexing of billions of individual archived items.

The present invention provides document image processing that includes suspect image and suspect document evaluation, this evaluation operating to automatically identify suspect images/documents. A plurality of digital images are formed of each document. Suspiciousness values are computed for each digital image, and these suspiciousness values are weighted in accordance with their criticality to archiving of the document.

As the terms are used herein, a document or check comprises the well-known hard copy of a document, such as a check. This hard copy of a check contains, for example, pre-printed graphic images and text, alphanumeric data that is printed using MICR ink, and machine printed and/or hand written data, such as the check's payee and amount.

The terms document image data or image data, as used herein, generally mean one or more digital pictures of the document or check.

The term coded data, as used herein, generally means data captured via Optical Character Reading (OCR), MICR reading, and the machine reading of handwritten data from the document or check.

The terms associated data or arbitrary associated data, as used herein, generally means user-defined data that is associated with the document or check, examples of which may be voice annotation data that is provided by a human operator at the time of document scanning, and signatures from a signature card that is associated with a particular checking account.

The term Document Data Structure (DDS) is intended to mean a collection of the above-defined image data, coded data, and associated data that relates to a given document or check.

As used herein, the term suspiciousness or suspiciousness value is intended to mean a measurement that is made by machine computation, this measurement being a simulation of the judgement that a human would make while viewing an image, and determining the ability of the image to convey meaningful information to a human viewer. In other words, the machine's measurement of the probability that a human would judge an image to be acceptable or unacceptable.

The invention provides for the archival storage of DDSs (i.e., digital images, related coded data, and associated data). Camera images are first formed by scanning the check. A plurality of digital images are then derived from each camera image. For example, the following four digital images are formed from the front and back camera images of a check: Front view, black/white image (FBW); front view, gray scale image (FGS); back view, black/white image (BBW); and back view, gray scale image (BGS).

An optional feature of the invention provides human review of images/documents, usually suspicious images/documents. Data and reports are generated to summarize image quality analysis results for individual suspect images of a document, for an entire document, and for Units of Work (UofW) comprising a very large number of documents (for example, in the range of 100,000 documents).

A plurality of digital image quality analysis parameters are operator defined. Using these parameters and any anomalous conditions detected during scanning and/or subsequent image processing, a suspiciousness value is computed for each digital image, document and UofW. Images and/or documents having suspiciousness values above operator-defined thresholds are identified as suspect documents. A document may also be identified as a suspect document independent of the directly detected quality of its digital images (for example, as a result of a detected malfunction in the document scanning mechanism during scanning of the document).

Image, document and UofW accept/reject decisions may be made based upon the computed suspiciousness values of each, and upon the image quality accept/reject parameters for images, documents, and UofWs. Rejected images, documents, and/or UofWs may be recaptured. Archival storing typically occurs only for images, documents and/or UofWs for which an accept decision has been made.

Optional human visual review is provided of documents images that are suspect, or are associated with documents that have one or more digital images that are suspect. An accept/reject decision may be made based upon this visual review. This decision may override the machine accept/reject decision for images, documents and UofWs. In addition, this human review of accepted documents is supported as a check on the machine accept decision. This optional human review of the machine operation facilitates adjustment of the image quality parameters so that the machine accept/reject decision more nearly corresponds to the accept/reject decision that a human would make. Some of the operator-defined parameters allow the optional human visual review step to be bypassed when the system is operating within normal or acceptable limits.

The present invention also provides a construction and arrangement that operates to automatically consolidate, or block, a plurality of DDSs into a large data block of, for example, 100 checks (this data block herein being called a DDS group as in FIG. 5) for efficient archival storage on a variety of media, including magnetic disks, magnetic tapes, and optical disks.

For example, the DDSs corresponding to 100 sequentially captured checks can be assembled into a DDS group for archival storage.

The present invention provides a hierarchical indexing method which, when combined with the above-mentioned method of DDS data consolidation, provides a practical means for indexing billions of individual checks, and that also allows appropriate trade offs to be made between retrieval performance and cost.

The storing of each DDS group also results in the storage of a DDS group level index that contains the address of each individual DDS that is contained in the DDS group. A typical retrieve request identifies a specific DDS. The identifier number of this DDS leads to the DDS group in which the DDS is located, and the DDS group level index of that DDS group provides the address of the requested DDS and, eventually, the individual digital image, coded data and associated data portions of the DDS.

As a feature of the invention, temporary storage of DDSs is provided. This temporary storage may be automatically erased and prepared for reuse after archival storage.

These and other object, advantages and features of the invention will be apparent to those of skill in the art upon reference to the following detailed description, which description makes reference to the drawing.

BRIEF DESCRIPTION OF THE DRAWING

FIG. 2 which comprises FIG. 2A

FIG. 7 which comprises FIG. 7A

DESCRIPTION OF THE PREFERRED EMBODIMENT

Figure 1:
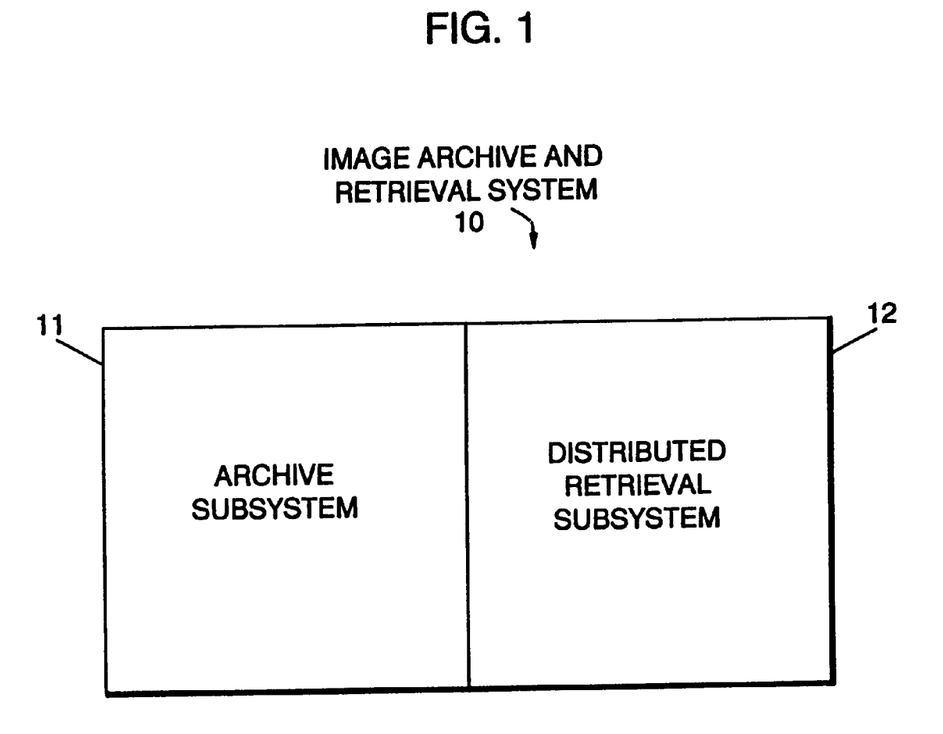
FIG. 1 shows the general configuration of an image archive and retrieval system that includes an archive subsystem in accordance with the invention.

The present invention relates to an archive subsystem that forms a portion of a larger image archive and retrieval system. FIG. 1 discloses the general configuration of such an archive/retrieval system 10. The present invention generally deals with archive subsystem 11.

Figures 2, 2A:
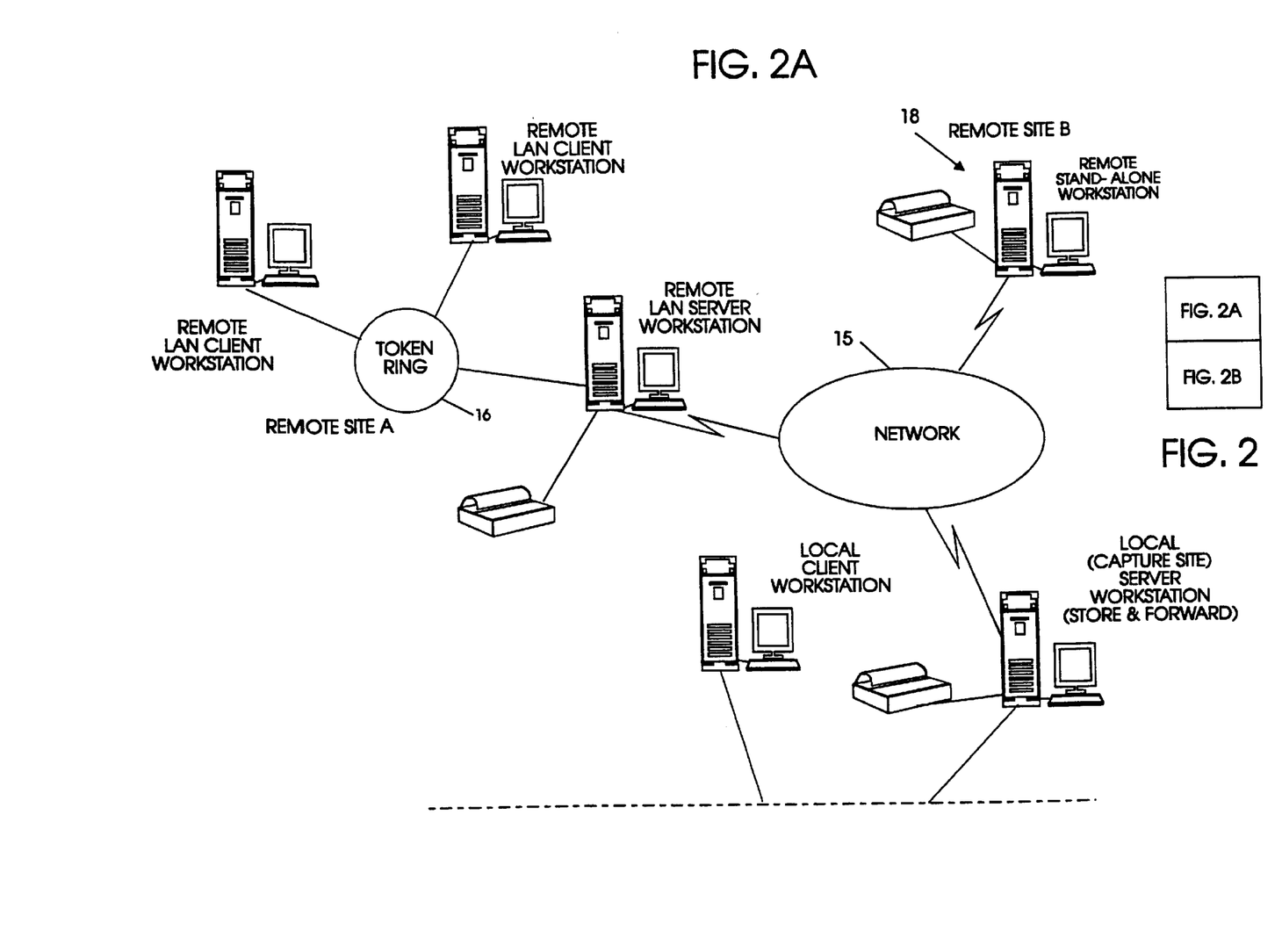
Figure 2B:
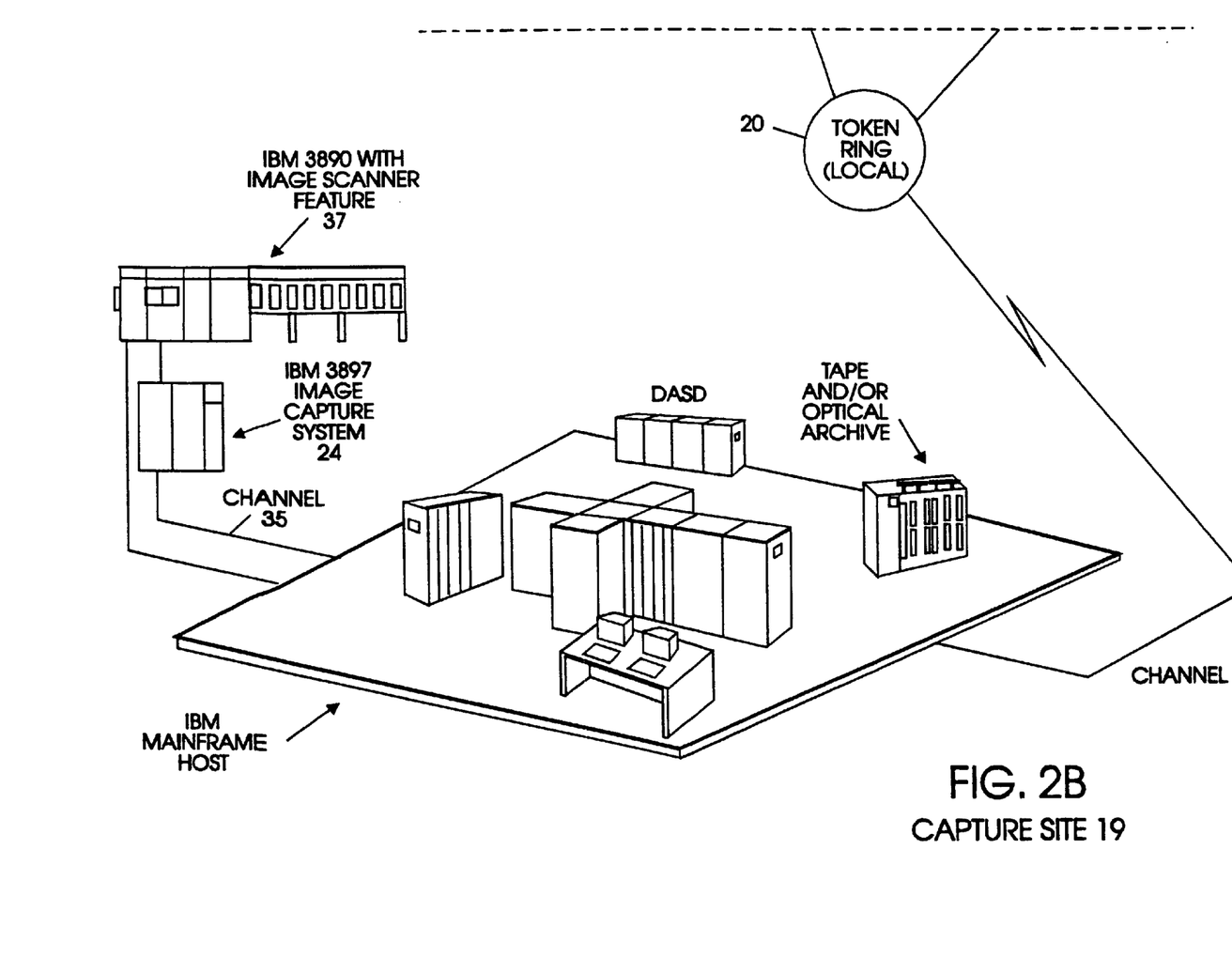
FIG. 2B shows the system topology of the image archive and retrieval system of FIG. 1 that includes an archive subsystem in accordance with the invention.

FIG. 2 provides a topology showing of archive/retrieval system 10. FIG. 2 includes a communication network 15 whose architecture is not critical to the invention. Network 15 communicates with a token ring network 16 that is located to serve a remote site A, with a remote site 18, and with a capture site 19 having a local token ring network 20. FIG. 2 is intended to be a nonlimiting representation and may, in fact, comprise multiple configurations of this general type, such configurations having, for example, multiple capture sites, multiple local and remote site servers, and multiple local and remote client workstations.

Archive subsystem 11 of FIG. 1 is located at capture site 19 of FIG. 2. Archive subsystem 11 is responsible for the capture, evaluation, and long-term storage of DDS, these functions being performed in a manner to optimize cost, processing efficiency, and image quality. Thus, archive subsystem 11 operates to capture, quality assure, and store DDS so that the DDS can be easily, cheaply, and reliably found later.

In general terms, archive subsystem 11 is constructed and arranged to automatically block many individual DDSs into a consolidated DDS group for efficient storage on a variety of media, including magnetic disks, magnetic tapes and optical disks. Archival subsystem 11 includes a suspect image/document processing function that automatically evaluates suspect images/documents, ranks the suspect images/documents by their degree of suspiciousness, allows high speed human review of suspect images/documents, and accumulates data and reports image quality statistics for the individual suspect images of a document, for entire documents, and for UofW comprising a number of documents.

Figure 3:
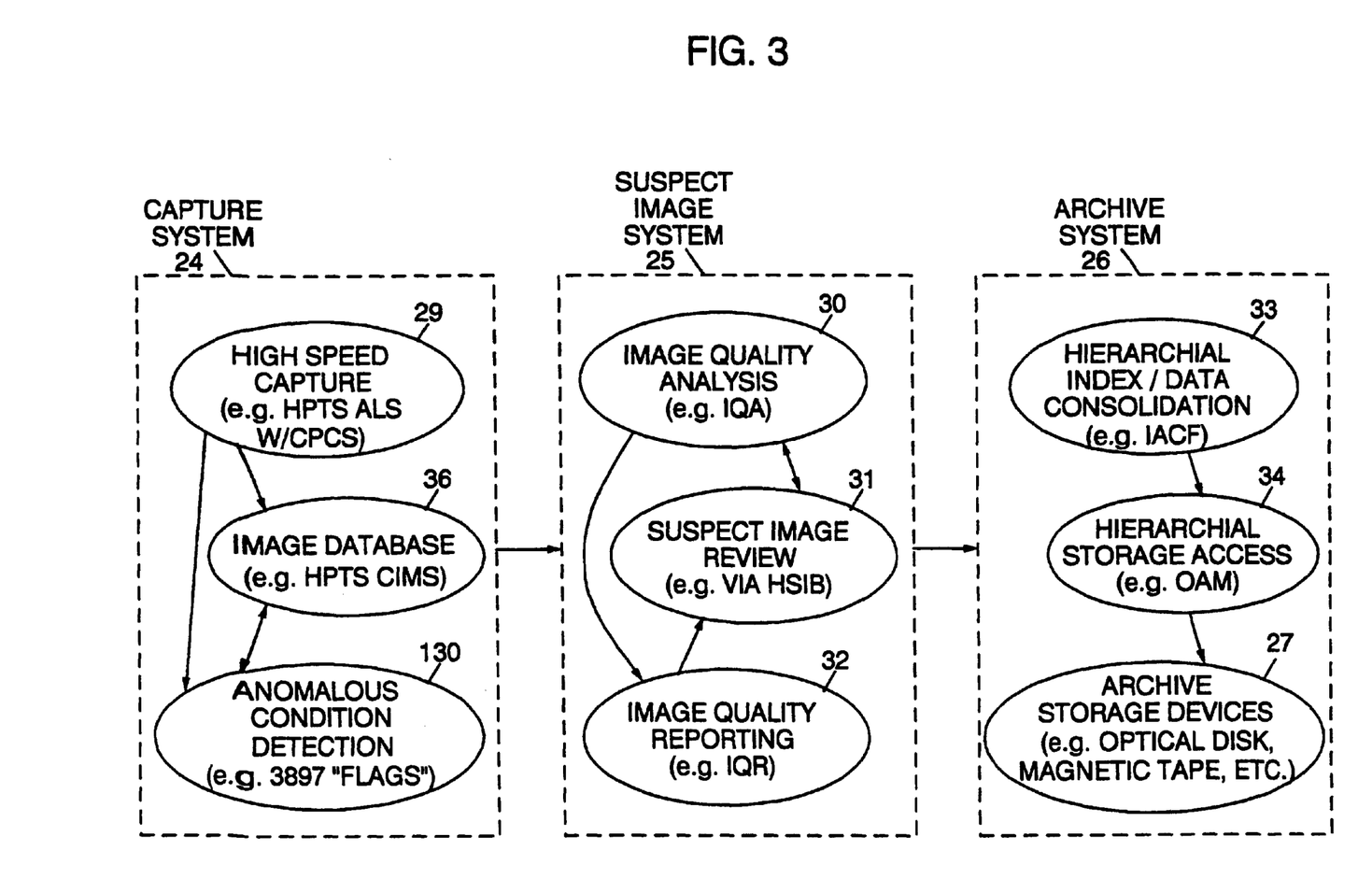
FIG. 3 show the major structural components that comprise the archive subsystem of the invention.

With reference to FIG. 3, archive subsystem 11 comprises three major structural components that operate to implement the three processes of (1) image capture, (2) suspect image processing, and (3) image archiving; i.e., capture system 24, suspect image system 25, and archive system 26 that includes archive storage devices 27.

Capture system 24 provides the image capture function for archive subsystem 11. Capture system 24 is implemented by (1) high speed capture process 29, one embodiment of which is the IBM ImagePlus High Performance Transaction Application Library Services (HPTS ALS) with an IBM Check Processing Control System (CPCS), by (2) image database 36, one embodiment of which is the IBM ImagePlus High Performance Transaction (HPTS) with an IBM Check Image Management System (CIMS), and by (3) anomalous condition detection process 130, one embodiment of which is an IBM 3897 that operates to generate anomalous condition flags.

Capture system 24 operates to produce one or more digital images of a document, such as a check, each of these digital images being derived from a camera image of the check. For example, the front and back camera images of a check are operated upon by a computer to produce the four digital images FBW, FGS, BBW, and BGS.

The CPCS portion of high speed capture process 29 provides for the management of coded data, such as the check's MICR characters identifying the check's account number, the bank's ABA number and the check's sequence number. CPCS also provides control of, and reporting of the results of high speed handling of checks and the like using, for example, the IBM 3890/XP family of document processors (see above-mentioned U.S. Pat. No. 4,888,812).

The HPTS portions of high speed capture process 29 and image database 36 manage the image data. The functions of image processing, image archiving and image retrieval are built on a software enabling base that is provided by HPTS ALS.

Suspect image system 25 is implemented by (1) Image Quality Analysis (IQA) process 30, (2) Suspect Image Review (SIR) process 31, and (3) Image Quality Reporting (IQR) process 32.

Image quality analysis process or facility 30 is a batch process system that provides automatic identification and analysis of suspect document images.

Suspect image review process, or facility 31, selectively provides operator review of suspect images at operator workstations.

Image quality reporting facility 32 is a batch process system that accumulates data from image quality analysis facility 30, and generates reports that are based upon this data.

Archive system 26 is implemented by (1) hierarchical index/data consolidation process 33, one embodiment of which is the IBM Image Archive Consolidation Facility (IACF), (2) hierarchical storage access process 34, one embodiment of which is the IBM Object Access Manager (OAM), and (3) archive storage devices 27.

In one embodiment, hierarchical index/data consolidation process 33 provides an interface tailored for the captured images that are provide by the HPTS ALS portion of high speed capture process 29. The primary function of hierarchical index/data consolidation process 33 is to consolidate captured images that are provided by high speed capture process 29 into DDS groups so as to provide optimum storage in storage devices 27 of a very large number of document images, and to provide optimum retrieval and unbundling, or de-consolidation, when later retrieving any number of document images from storage devices 27.

Hierarchical index/data consolidation facility 33 operates to copy digital images from the CIMS portion of image database 36, and to consolidate these images into large DDS data structures (i.e., large data structures for storing document images and information in digital form, sometimes called BLOBS) that are then moved to, or stored in, storage devices 27 under control of hierarchical storage access facility 34.

Hierarchical storage access facility 34 provides for the storage and retrieval of DDS data that is to be stored in, or read from, storage devices 27. Hierarchical storage access facility 34 provides a constant interface between hierarchical index/data consolidation facility 33 and storage devices 27, independent of what specific type of storage devices are used in storage 27 (for example, magnetic or optical storage).

Figure 4:
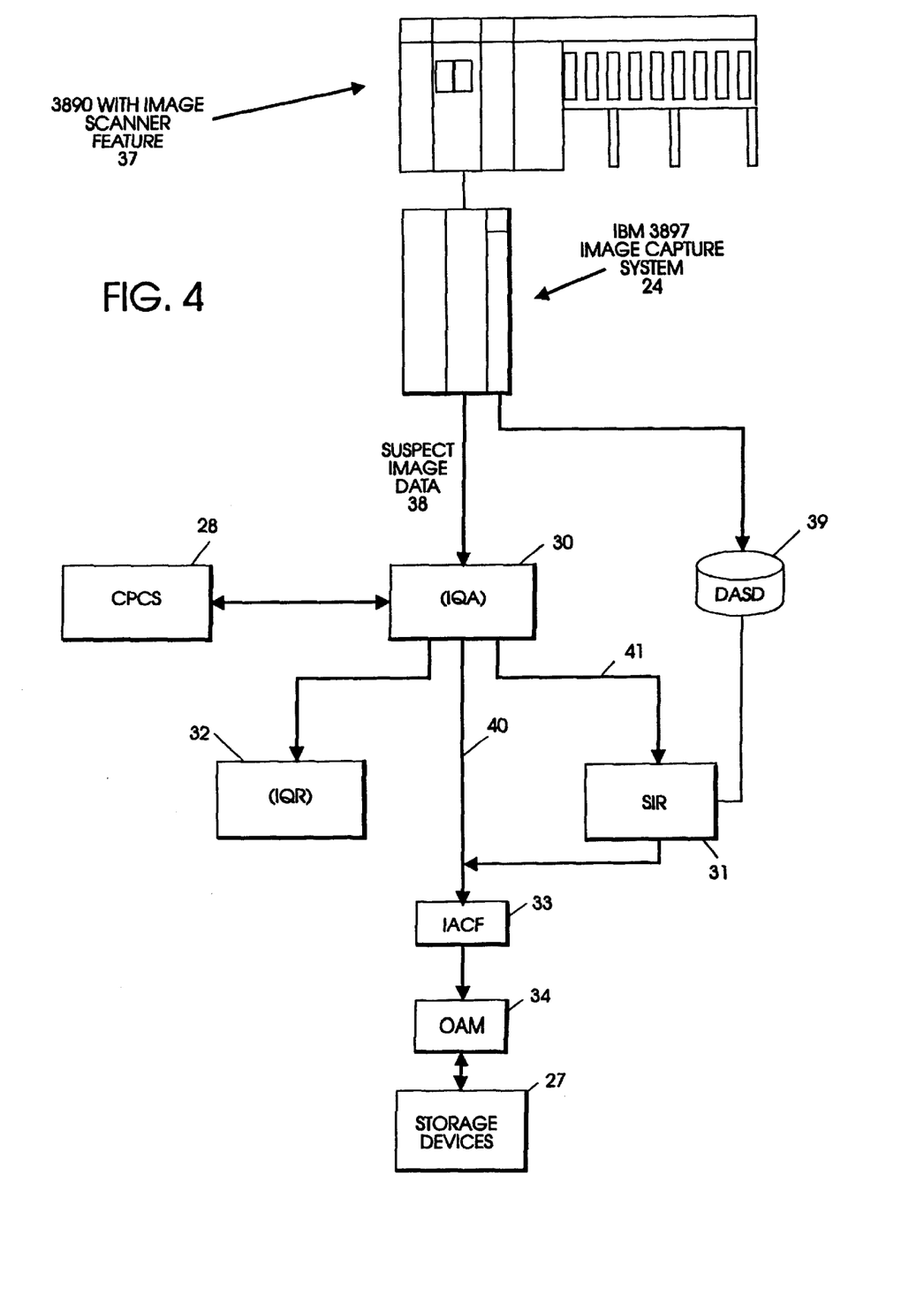
FIG. 4 shows the capture/archive work flow of an embodiment of FIG. 3.

FIG. 4 shows an embodiment of the capture/archive work flow that is provided by FIG. 3. Image scanner 37 operates to scan checks and the like, as is described in above-mentioned U.S. Pat. No. 4,888,812. The scanner output therefrom is provided to image capture system 24.

Capture system 24 identifies document images and/or document and/or UofW whose quality is suspect. Image quality reporting facility 32 provides detailed reports relative to the input to image quality analysis facility 30, and the output from image quality analysis facility 30.

Capture system 24 automatically reviews each digital image of each document, looking for a variety of machine detectable anomalous conditions, while simultaneously verifying the correct operation of associated scanning devices and software. Any detected anomalous condition in either the document image or its associated data, or in the operation of the image capture system, causes the related image and/or document to be flagged as a suspect image and/or document. It is to be noted that a document can be flagged as a suspect document in the absence of any suspect image being found relative to the document. For example, if during the scanning of a document it is noted that the document moved too slowly, or if it is noted that the document illumination lamp was too bright during scanning, then the document will be flagged as a suspect document. A list of all suspect documents, and the identifying suspect flags that are associated therewith, is created by capture system 24 in a data file. All captured image data is stored on DASD 39 independent of whether or not the image data is suspect image data.

Image quality analysis facility 30 operates to perform a statistical analysis of suspect image/document/UofW data. For example, but without limitation thereto, image quality analysis facility 30 determines the quality of each image that is identified as a suspect image by image capture system 24, or of each image that is associated with a suspect document, determines the quality of each document that is identified as a suspect document, or has one or more suspect images, and determines the quality of each UofW that includes one or more suspect images or documents. The results of this determination are accumulated in a file for use in the review of suspect images/documents, and for use in image quality reporting by image quality reporting facility 32. If a UofW has no suspect images and/or documents, this fact is simply recorded relative to this particular UofW.

Image quality analysis facility 30 is selectively operable in either an automatic mode or a verify/human intervention mode. In the automatic mode, image quality analysis facility 30 communicates directly with hierarchical index/data consolidation facility 33, as shown at 40 in FIG. 4. In the verify mode, image quality analysis facility 30 communicates with hierarchical index/data consolidation facility 33 and suspect image review facility 31 under manual control, as shown at 40 and 41.

The verify mode of operation can, for example, be used to allow the operator to review accepted UofWs at suspect image review facility 31 in order to verify that the parameters by which image quality analysis facility 30 makes its accept/reject decision are, in fact, the correct parameters to produce a proper machine determination of UofW quality when operating in the automatic mode. By the operator adjusting these parameters, image quality analysis facility 30 "learns" to operate properly.

When image quality analysis facility 30 is set to the automatic mode, and when image quality analysis facility 30 determines that a UofW can be archived, then hierarchical index/data consolidation facility 33 and hierarchical storage access facility 34 operate to store the UofW on storage devices 27.

When image quality analysis facility 30 is set to the verify mode, or when image quality analysis facility 30 indicates rejection of a document or a UofW, then suspect image review facility 31 allows an operator to visually review the document images of a UofW. The operator can elect to replace any suspect image by, for example, manual rescan of the suspect images, whereupon the operator can make an archive decision.

The operator makes an archive/reject decision based upon a dynamic visual review of some, or all, of the suspect images in the UofW, and can also use a related report for that UofW, which report is generated by image quality reporting facility 32.

If the UofW is accepted by the operator at suspect image review facility 31, the archive process (i.e., storage of the UofW at storage devices 27) proceeds, either by way of automatic operation, or archiving is manually invoked by the operator at suspect image review facility 31. If the UofW is not accepted by the operator at suspect image review facility 31, then no archive takes place, and the entire UofW must be recaptured by operation of image scanner 37, or perhaps by operation of a low speed recapture scanner (not shown). A reject decision causes the UofW to be deleted from DASD 39.

As part of the work flow of FIG. 4, image quality reporting facility 32 operates automatically, or on operator demand, to provide hard copy printout detailing and summarizing information, either for an individual UofW or for an entire time period of operation of image quality analysis facility 30. Thus, image quality reporting facility 32 enables the evaluation and compilation of both long and short term trends and statistics relative to suspect image occurrences, and suspect image processing by image quality analysis facility 30. This evaluation and compilation is controlled by operator specified parameters.

Suspect image review facility 31 allows human operators to browse through document images of either accepted documents or suspect documents. This image browse function allows operators, at suspect image review workstations 31, to examine all of, or perhaps just some of, the images that are contained in an operator-specified UofW. This browse function includes features, such as zoom, enhance, show alternate views, print, etc. Note that this image browse function takes place while the UofW still resides only on DASD 39; i.e., the UofW has not as yet been archived. While the operator can specify any Document Identifier (DI) of a document image to be reviewed, generally it is desirable that the images be reviewed in descending order of suspiciousness value. The operator need not know the DI of a document whose images are to be reviewed, but can alternatively specify a DDS whose images are to be reviewed. More specifically, the operator can specify review of a DDS by using its identifier, or can specify that the next DDS be presented for review.

Figure 6:
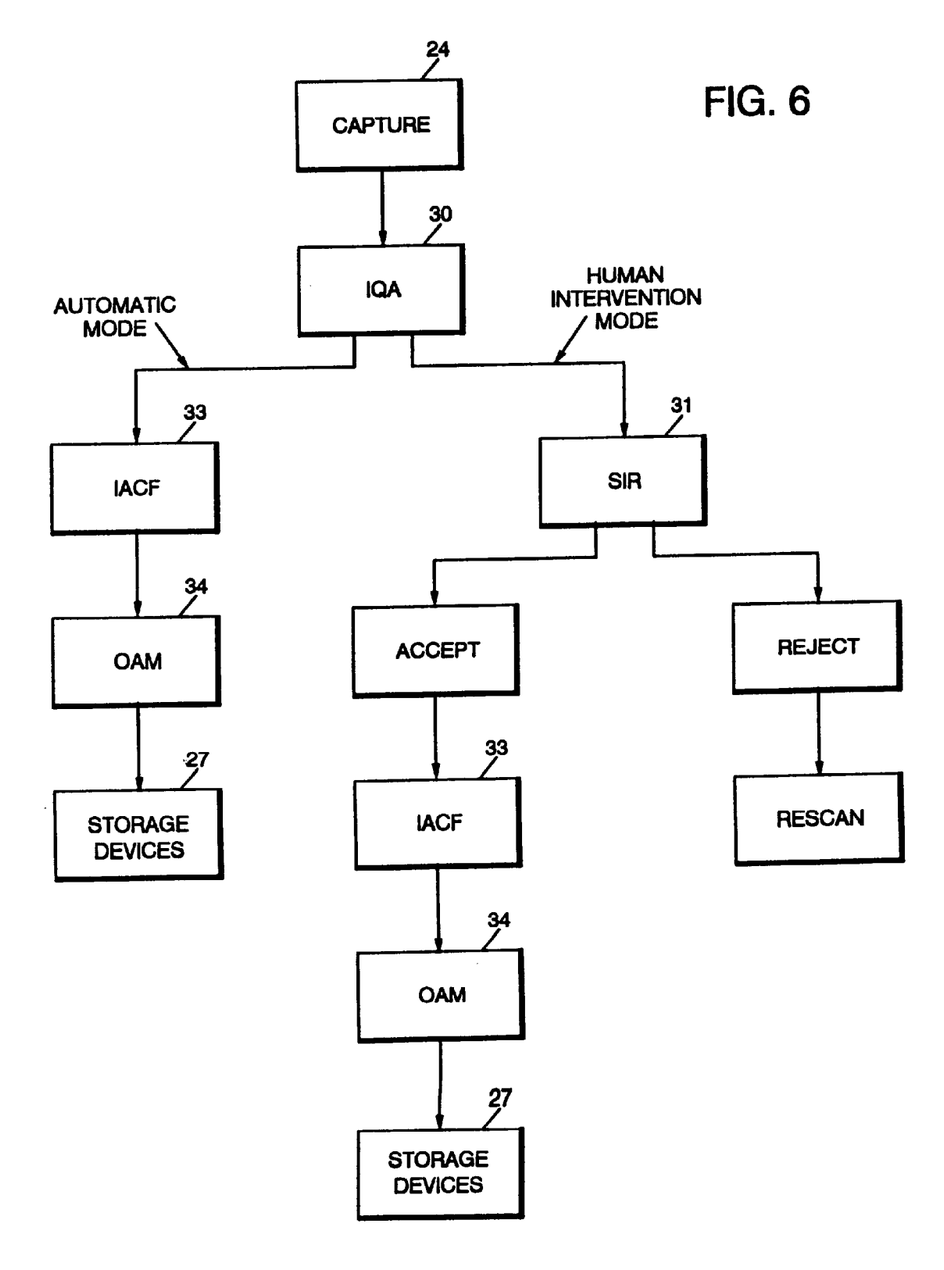
FIG. 6 illustrates how the image quality analysis facility of FIG. 3 selectively operates in an automatic mode, or a human intervention mode at the election of an operator.

FIG. 6 illustrates how image quality analysis facility 30 selectively operates in an automatic mode, or a human intervention mode, at the election of an operator. Capture system 24 provides an output to image quality analysis facility 30, as above described. When image quality analysis facility 30 has been set to the automatic mode, and when image quality analysis facility 30 accepts a UofW for archive, then hierarchical index/data consolidation facility 33 and hierarchical storage access facility 34 operate to automatically store the UofW at storage devices 27 without the need for human intervention.

When image quality analysis facility 30 has been set to the verify or human intervention mode, then suspect image review facility 31 is given the opportunity to review both accepted and rejected UofWs. The operator, at suspect image review facility 31, can elect to accept a UofW without review, whereupon hierarchical index/data consolidation facility 33 and hierarchical storage access facility 34 operate to store the UofW at storage devices 27. If the operator, at suspect image review facility 31 elects to browse some or all of the document images of a UofW, then the operator can elect to accept the UofW after review, or the operator can replace bad document images by using a manual, slow speed scanner to rescan the rejected documents of the UofW, or the operator can reject the UofW after review and perhaps then initiate a rescan of all rejected documents of the UofW.

Figure 5:
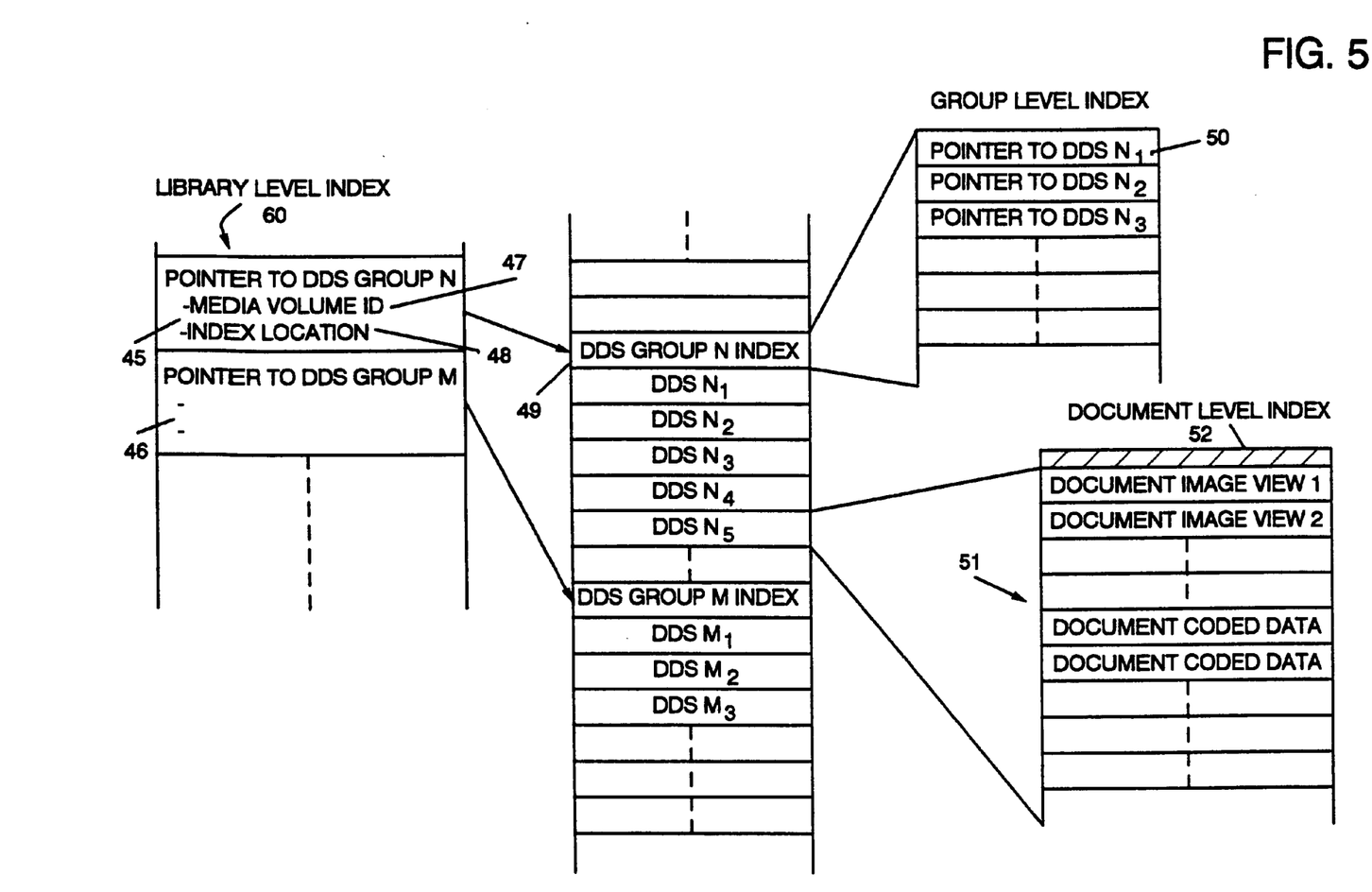
FIG. 5 is a diagram showing the sequential method of storing DDS group files, and the manner in which each file contains a hierarchical index in accordance with the invention.

Relative to FIG. 5, as each UofW (typically comprising from ten thousand to one hundred thousand documents or checks) becomes available for archive, hierarchical index/ data consolidation facility 33 processes a UofW by consolidating or packaging individual DDSs into larger DDS groups or objects (each containing 100 DDSs, for example) prior to storing the consolidated data on storage devices 27 by operation of hierarchical storage access facility 34.

Each such DDS group includes an index that is constructed by hierarchical index/data consolidation facility 33. This index specifies the storage location or address of individual DDSs within the DDS group. In addition, hierarchical index/data consolidation facility 33 generates an identifying key for each such DDS group.

FIG. 5 shows a hierarchical index in accordance with the invention, this index defining the sequential method of storing DDS group files.

The hierarchical indexing and data consolidation function shown in FIG. 5 (i.e., 33 of FIG. 3) operates to consolidate individual DDS elements into larger data structures, two of which are identified as DDS group N and DDS group M. As shown, DDS group N comprises DDS N1, DDS N2, etc., whereas DDS group M comprises DDS M1, DDS M2, etc.

Each such DDS group is indexed as a single entity (for example, by a pointer 45 for DDS group N), which pointer 45 includes the media volume ID 47 and the index location 48 in this media volume where DDS group N and its index 49 are stored.

In addition, each index that is stored for each DDS group (for example, index 49 for DDS group N) contains a pointer for each individual DDS within the DDS group (for example, pointer 50 to DDS N1).

In addition, each stored DDS may include an index to the sub elements of the DDS. For example, as shown in FIG. 5, DDS N5 includes a pointer to the storage locations 51 that contain the various image views of DDS N5, the coded data for DDS N5, and other associated data, such as voice data for DDS N5.

As an alternative to what is shown as document level index 52 in FIG. 5, each DDS subelement may be self-identified as to its length and type, thereby allowing a simple data parsing scheme to locate the subelements of a DDS.

Library level index 60 of FIG. 5 contains a set of pointers or records identified as 45,46—, each record pointing to a specific DDS group. Depending upon the storage size of the archive device and the storage size of each media volume, there may be one library level index 60 per media volume, or the library level index may be maintained on a separate, high speed access media, such as DASD, or perhaps even in memory.

As will be appreciated, the hierarchical scheme of FIG. 5 can be extended to an arbitrary number of levels, providing increased levels of index consolidation.

Hierarchical index/data consolidation facility 33 of FIG. 3 requests hierarchical storage access facility 34 to store a DDS group, such as group N at devices 27. Hierarchical index/data consolidation facility 33 creates a record of all such DDS groups that have been successfully archived at devices 27, thus allowing the deletion of the specified DDS groups from the CIMS portion of image database facility 36, thereby freeing up storage space that is associated with the CIMS portion of image database facility 36.

The number of DDSs to be consolidated into a single DDS group can be defined by the operator, and can be changed to suit the storage characteristics of storage devices 27.

All DDS groups that are formed by hierarchical index/data consolidation facility 33 may include a document level index, such as 52 of FIG. 5, that contains the addresses of the associated image data, coded data, and other data related to each DDS within the DDS group. When a DDS group is later retrieved, this index 52 allows direct access to data within an DDS group with a granularity that depends upon the granularity of the DDS group's index 52.

Hierarchical storage access facility 34 can retrieve a partial DDS group by first retrieving the DDS group's index 52, from which the address of the required item is identified, and the specific DDS item is then retrieved from storage 27.

When hierarchical index/data consolidation facility 33 operates in a retrieval mode, hierarchical index/data consolidation facility 33 first determines which DDS group contains the requested item. For example, a request for the coded data contained within DDS N1 is known to be contained in DDS group N. The index 49 of DDS group N is now retrieved from storage, the address of DDS N1's coded data is read, and this address is used to fetch this coded data from storage 27.

In order to retrieve all DDSs that are contained in DDS group N from archive storage, the retrieve request from hierarchical index/data consolidation facility 33 need contain only the address of the first DDS within DDS group N. This retrieve request results in the fetching of all DDS group N DDSs from storage 27.

When a specific DDS is requested, or when a portion of an DDS is requested (for example, the DDS N5), specifying this DDS's identifier results in the fetching of index 49 of DDS group N from archival storage. Index 49 is then used to find the address of DDS N5, or its related data, within DDS group N.

Figures 7, 7A:
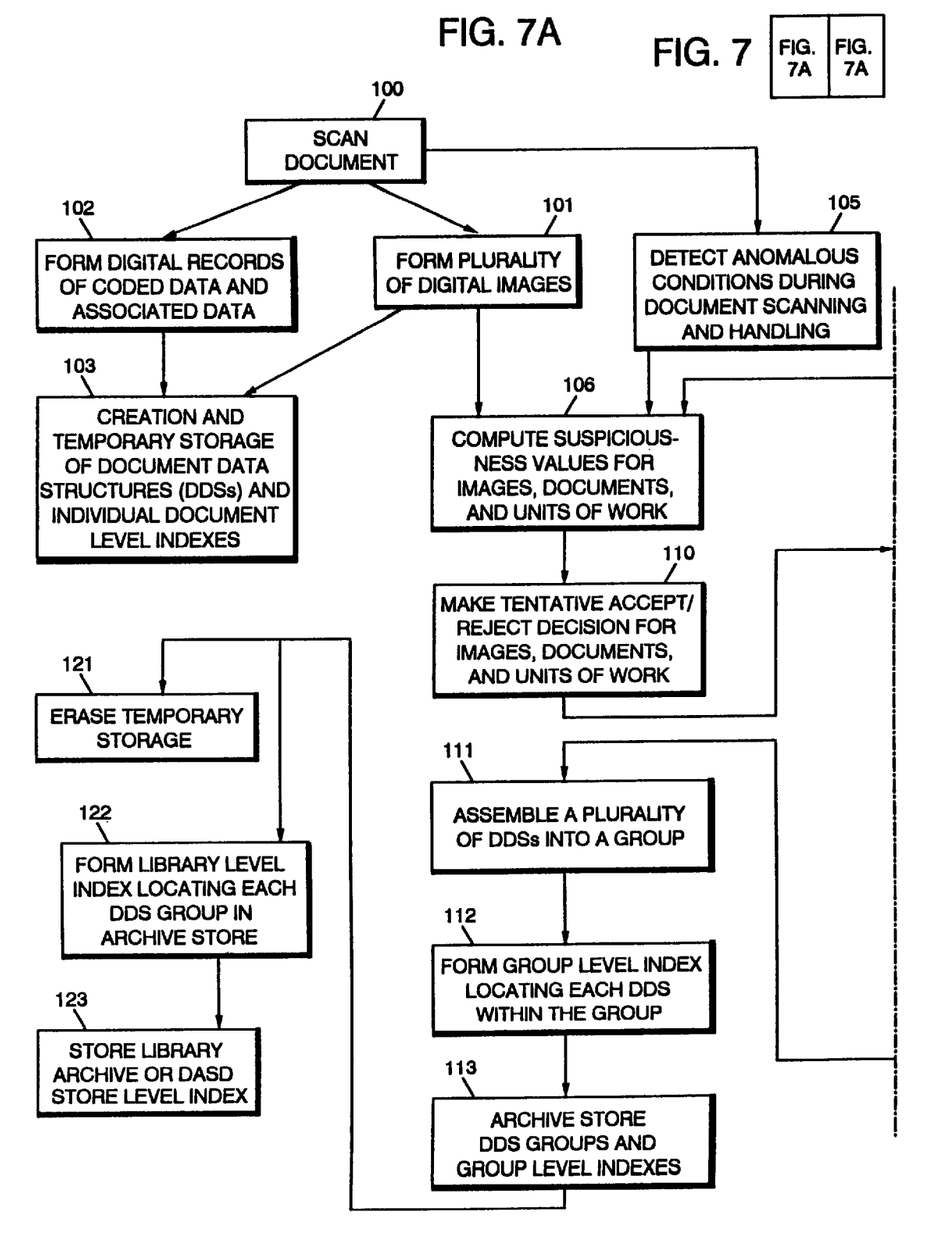
Figure 7B:
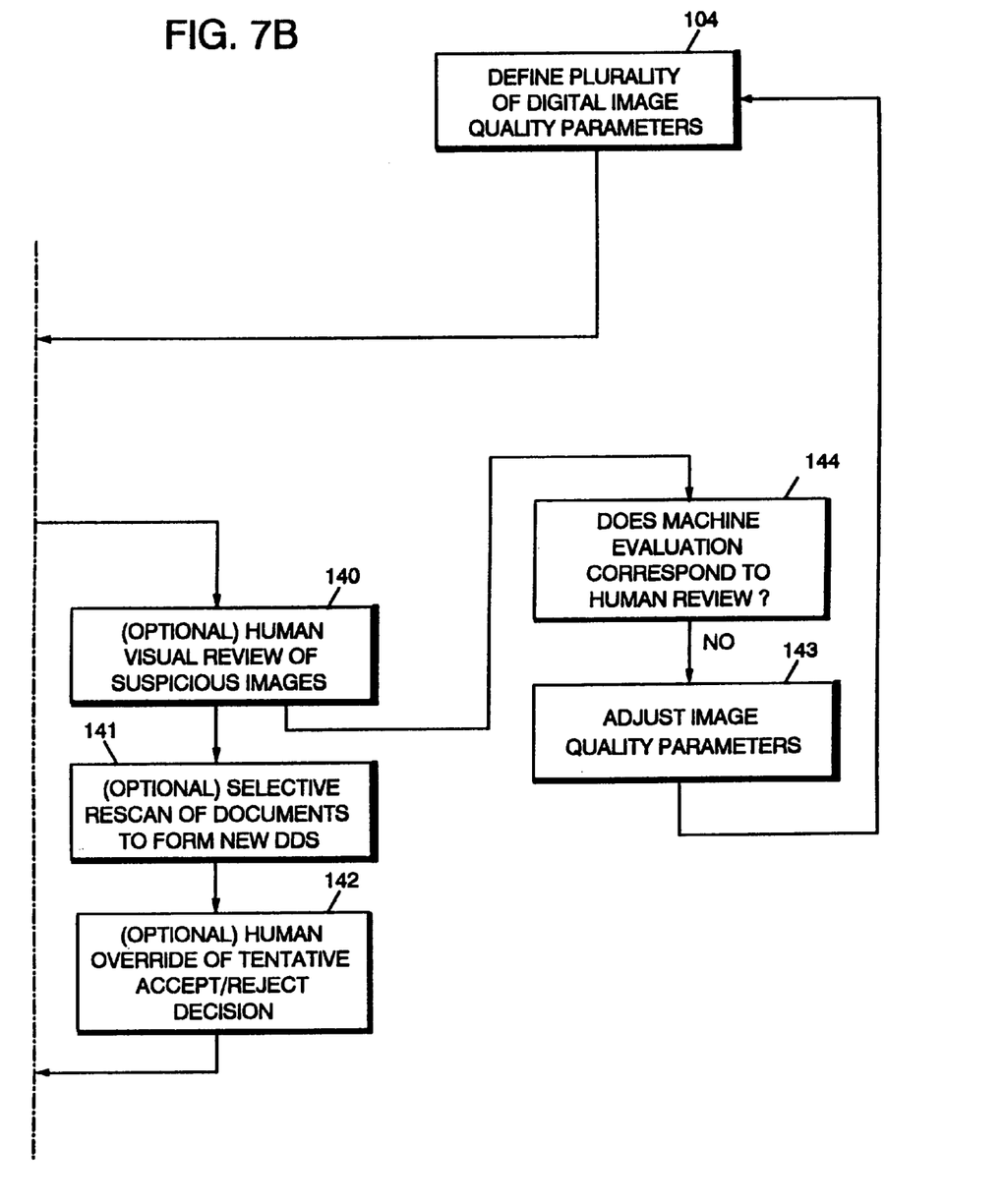
FIG. 7B illustrates the work flow operation of the invention.

FIG. 7 illustrates operation of the invention wherein operation begins with the scanning of a check at 100. This scanning of a check results in the formation of a plurality of digital images at 101, the formation of digital records of the check's coded data and associated data at 102, and the detection of anomalous conditions during check scanning and handling at 105. At 103, the images provided by 101 and the data provided by 102 are consolidated, or formed into DDSs, a document level index is formed for this DDS, and this DDS is temporarily stored.

At 104, an operator has defined a plurality of digital image quality parameters by which digital images 101 are to be machine judged.

At 106, the machine uses image quality parameters 104, detected anomalous conditions 105, and digital images 101 to compute suspiciousness values. As a result of this comparison, a tentative accept/reject decision is made at 110. The details of construction and operation of function 106 is described in detail in patent application Ser. No. 08/371,938 filed Jan. 12, 1995, which application is a continuation of application Ser. No. 08/195,728, entitled "Image Quality Analysis Method and Apparatus", filed Feb. 14, 1994, incorporated herein by reference.

When the decision at 110 is to accept for archive, a plurality of DDSs are assembled into a DDS group at 111, the group level index of FIG. 5 is formed to locate, or address, each DDS within the DDS group, and archive storage of the DDS group and its group level index takes place at 113. Temporary storage 103 is now erased at 121. The library level index of FIG. 5 is formed at 122 to locate, or address, each DDS group in archive storage 27, whereupon the library level index is stored in archival storage 27 or on DASD at 123.

FIG. 7 illustrates an optional embodiment of the invention whereby selective human visual review of suspicious images occurs at 140. This review may result in selective rescanning of documents to form a new DDS at 141, with the possibility that subsequent human override of tentative accept/reject decision 110 may occur at 142. FIG. 7 also illustrates that the operator may selective change digital image quality parameters 104 when the operator does not agree at 144 with the machine determination of quality. Adjustment of the image quality parameters at 143 is intended to bring machine accept/reject decision 110 into correspondence with the human review that occurred at 140.

While invention has been described while making reference to preferred embodiments thereof, it is to be recognized that those of skill in the art will readily visualize yet other embodiment that are within the spirit and scope of the invention. Thus, it is not intended that the above detailed description be taken as a limitation on the invention.

What is claimed is:

1. A machine-based document archival method for processing one or more digital images of each of a plurality of documents and digital data that is associated with said documents, comprising the steps of;

machine scanning a document and forming one or more digital images and associated data that correspond to said document, machine detecting anomalous conditions that may occur during said scanning and/or during subsequent image processing, defining a plurality of image quality parameters, machine computing a suspiciousness value for each of said plurality of digital images as a function of said defined image quality parameters and said detected anomalous conditions, continuing said machine scanning of said plurality of documents independent of the results of said machine computation of suspiciousness value, making a machine recommendation to archive based upon said machine computed suspiciousness values for each of said plurality of digital images, machine archive storing said one or more digital images and said associated data in a digital storage device only when a recommendation to archive has been made, providing machine temporary storage of digital images and associated data prior to said machine archive storing step, machine erasing said temporary storage after said machine archival storing step, machine converting into visual images the digital images of a document having one or more digital images that are of suspect quality, providing human visual review of said visual digital images, making a human document accept/reject decision based upon said human visual review, and changing said image quality parameters in a manner to produce future correspondence between said machine computation of suspiciousness value and said human document accept/reject decision.

2. The method of claim 1 including the step of;

assembling a plurality of images and associated data of recommend-to-archive documents into a data group for machine archival storage, said data group containing an index identifying the storage location within said data group of each of the recommend-to-archive documents assembled thereinto, and said step of machine archive storage including the step of machine identifying the storage location of each data group stored in said digital storage device.

3. The method of claim 2 including the step of;

machine retrieving a selected document from said digital storage device by defining the storage location of the data group containing said selected document, machine fetching said data group index from said digital storage device at said defined data group storage location, machine reading the stortage location of said selected document from said fetched index, and machine fetching said selected document from said digital storage device.

4. A document image processing method, comprising the steps of;

machine scanning a document and forming a plurality of digital images that correspond to said document, detecting anomalous conditions that may occur relating to said machine scanning, defining a plurality of digital image quality parameters, machine calculating an image suspiciousness value for each of said plurality of digital images based upon said parameters and said detected anomalous conditions, machine calculating a document suspiciousness value based upon said parameters and said calculated image suspiciousness values, using a machine to make a document accept/reject decision based upon said document suspiciousness value, repeating said method steps to thereby continue said scanning of documents independent of the results of said document accept/reject decisions for each scanned document, when a document-relect decision has been made, providing machine rescan of said rejected document, using a machine to assemble a plurality of digital images from a plurality of documents for which a document-accept decision has been made into a data group that contains an index defining the storage location within said data group of said plurality of digital images, storing said data group in a digital storage device, said storing step including identifying the storage location of each data group that is stored in said digital storage device, using a machine to convert the digital images corresponding to a document for which a document-relect decision has been made into visual images, providing review of said visual images by a human operator, and changing said digital image quality parameters so as to produce future correspondence between said machine accept/reject decision step and said operator visual review.

5. The method of claim 4 including the step of;

using a machine to retrieve at least one digital image of a selected document from said digital storage device by defining the storage location of the data group containing said selected document, using a machine to fetch said index of said data group from said digital storage device, using a machine to read the storage location of said selected document from said fetched index, and using said read storage location to machine fetch said at least one digital image of said selected document from said digital storage device.

6. The method of claim 4 including the steps of;

machine scanning a large plurality of documents to form for each of said documents at least one digital image, forming a similar large plurality of associated data individually corresponding to each one of said large plurality of scanned documents, using a machine to assemble the plurality of digital images and the associated data that correspond to a small plurality of documents into a data group, providing a library level index pointing to the storage location of said data group, providing a group level index pointing to the storage location of said digital images and associated data in said data group, and archive storing said library level index, said group level index, said digital images, and said associated data of said data group.

7. The method of claim 6 including the step of;

for each document in said data group, providing a document level index pointing to the storage locations of said digital images and associated data that correspond to each said document, and storing said document level index.

* * * * *